United States Patent [19]

Howe et al.

[11] Patent Number: 5,043,043

[45] Date of Patent: Aug. 27, 1991

[54] METHOD FOR FABRICATING SIDE DRIVE ELECTROSTATIC MICROMOTOR

[75] Inventors: Roger T. Howe, Lafayette, Calif.; Jeffrey H. Lang, Waltham, Mass.; Martin F. Schlecht, Lexington, Mass.; Martin A. Schmidt, Newton Highlands, Mass.; Stephen D. Senturia, Boston, Mass.; Mehran Mehregany, Shaker Heights, Ohio; Lee S. Tavrow, Somerville, Mass.

[73] Assignee: Massachusetts Institute of Technology, Cambridge, Mass.

[21] Appl. No.: 542,435

[22] Filed: Jun. 22, 1990

[51] Int. Cl.$^5$ .................... H01L 21/306; B44C 1/22; C03C 15/00; C03C 25/06

[52] U.S. Cl. .................................. 156/645; 156/651; 156/653; 156/657; 156/659.1; 156/662; 310/309

[58] Field of Search ............... 156/629, 633, 634, 643, 156/645, 650, 651, 652, 653, 655, 656, 657, 659.1, 662; 310/309, 42, 90.5

[56] References Cited

U.S. PATENT DOCUMENTS 4,740,410  4/1988  Muller et al. .................. 156/656 X
4,943,750  7/1990  Howe et al. ........................ 310/309

OTHER PUBLICATIONS

"New Generation of Tiny Motor Challenges Science to Find Uses", New York Times, Jul. 26, 1988, pp. c1 and c12.

"Transducers 89", Abstract Conferences on Solid-State Sensors and Actuators, Montreaux, Switzerland, Jun. 25-30, pp. 106-107 and 256.

"The Wobble Motor: An Electrostatic Planetary-Armature Microactuator", by S. C. Jacobsen et al., Proceedings of Micro Electromechanical Systems, IEEE Robotics and Automation Counsel, Salt Lake City, UT, 2/20-22/89, pp. 17-24.

"Principles in Design and Microfabrication of Variable-Compacitance Side-Drive Motors", by Mehran Mehregany et al., 36th National Symposium of the American Vacuum Society, Oct. 23-27, 1989, Boston, MA, proceedings p. 108.

"Electric Micromotors—A Status Report" by J. H. Lang, presented at the International Conference on Electric Machines, MIT, Cambridge, MA, Aug. 13, 1990, pp. 1-5.

"Electrical Operation of Microfabricated Wobble and Side-Drive Motors" by M. Mehregany et al., presented at the 3rd IEEE Workshop on MEMS, IEEE Robotics and Automation Council, Napa Valley, CA, Feb. 12, 1990, pp. 1-3.

"Microfabricated Silicon Electric Mechanisms" by M. Mehregany, Doctoral Thesis at the Massachusetts Institute of Technology, May 1990, Abstract pp. 1-2.

"Modeling and Design of Electroquasistatic Microactuators" by S. F. Bart, Doctoral Thesis at the Massachusetts Institute of Technology, Sep. 1990, Abstract pp. 5 and 6.

Primary Examiner—William A. Powell
Attorney, Agent, or Firm—Hamilton, Brook, Smith & Reynolds

[57] ABSTRACT

An electrostatic micromotor employs a side drive design. The stator operates in a plane above a substract and a moveable member lies and moves in the plane of the stator. An electrostatic field of operational strength is generated and sustained without breakdown in the plane between the stator and edges of the moveable member. Three fabrication processes enable formation of a moveable member in the plane of operation of the stator and spaced apart from the stator by a micron amount. One fabrication process deposits and patterns a structural layer to form the stator and moveable member over a sacrificial layer. A second fabrication process etches channels in a first structural layer to outline a stator, moveable member, and if desired, a bearing. A substrate is connected to the side of the structural layer through which the channels are etched and the opposite side is ground down to the ends of the channels to form salient stator, rotor and, if desired, bearing structures. The third fabrication process grows a sacrificial layer by local oxidation in an etched cavity of the substrate. A structural layer is then deposited and patterned over the substrate and sacrificial layer to form the stator and moveable member in a common plane. A harmonic side drive micromotor is also provided by the fabrication processes.

7 Claims, 9 Drawing Sheets

METHOD FOR FABRICATING SIDE DRIVE ELECTROSTATIC MICROMOTOR

The Government has rights in this invention pursuant to grant No. ECS-8614328 awarded by the National Science Foundation.

RELATED APPLICATIONS

The following is related to U.S. patent application Ser. No. 07/052,725 filed on May 20, 7, 1987 now U.S. Pat. No. 4,943,750 for an "Electrostatic Micromotor" and assigned to the assignee of the present invention. That application is herein incorporated by reference. An application entitled "Microfabricated Harmonic Side Drive Motors" is being filed on even date herewith by Mehran Mehregany and is incorporated herein by reference.

RELATED PUBLICATIONS

Details of the present invention are presented in the following publications which are incorporated herein by reference:

Mehregany et al., "A Study of Three Microfabricated Variable-capacitance Motors," *Sensors and Actuators*, A21-A23 (1990) 173-179.

Tavrow et al., "A LOCOS Process for an Electrostatic Microfabricated Motor," *Sensors and Actuotors*, A2-1-A23 (1990) 893-898.

Mehregany et al., "Friction and Wear in Microfabricated Harmonic Side-Drive Motors," presented at IEEE Solid-State Sensor & Actuator Workshop, Hilton Head, S.C. June 4-7, 1990.

Mehregany et al., "Operation of Microfabricated Harmonic and Ordinary Side-Drive Motors," presented at 3rd IEEE Workshop on Micro Electro Mechanical Systems, Napa Valley, Cal., Feb. 1990.

Mehregany, "Microfabricated Silicon Electric Mechanisms", Massachusetts Institute of Technology Doctoral Thesis, May 1990.

BACKGROUND OF THE INVENTION

Microsensor technology has rapidly developed over the past decade. There are silicon microsensor chips that sense mechanical variables such as acceleration. There is a microsensor, the silicon diaphragm pressure sensor, which as its name implies measures pressure and is now manufactured in quantities of several million per year. Chemical sensors have also been fabricated on silicon substrates to sense ion concentration, dielectric properties of materials, organic vapor concentrations, and gas concentration, etc.

However, existing microstructures, such as diaphragms and microbridges, used in these microsensors are usually unable to move in any direction and those which are able to move do so only a few micrometers in a direction perpendicular to the plane of the substrate. The limited travel, coupled with the rather small forces that can be applied to deflect the structure, have discouraged development of a microactuator technology. The few existing microactuators are for special applications where small displacements are sufficient. These include a micromachined crosspoint switching array, a microvalve for a wafer-scale gas chromatograph, and a piezoelectrically pumped cavity for an ink-jet printer. There are no microfabricated actuators in which a microstructure executes unrestrained macroscopic motion. Further, most microsensors are based on chemical processes for fabricating micromechanical structures on silicon substrates. These special micromachining techniques include etching of the silicon wafer (bulk micromachining) and selective etching of multilayer thin film sandwiches (surface micromachining) which are not compatible with the materials of most existing actuators.

There are basically two types of actuators, electric and magnetic. These two types are generally referred to herein as electroquasistatic (EQS) and magnetoquasistatic (MQS) actuators, respectively. Conventionally, MQS actuators are preferred over EQS actuators due to the former having larger energy and torque densities when limited by the physical and practical constraints of conventionally sized and fabricated actuators.

Neither EQS nor MQS actuators used for large scale, macro systems are easily scaled down to apply to micro scaled devices. For example, macroscopic MQS actuators follow Ampere's Law where the line integral of the magnetic field H around a closed path $\int H \cdot dL$ is equal to $\mu_0 \int J \cdot dA$ where J is the current density through the area A bounded by the path. As an MQS actuator is scaled down in size, the integrated area, A, decreases more rapidly than the integrated length, L, and it becomes difficult to obtain the current density J needed to produce the same magnetic field H. That is, for constant H, hence constant energy density and torque density, the current density J, and hence energy dissipation density, must increase.

On the other hand, EQS actuators in macro systems require high voltages which are limited by the breakdown voltage of air or the gas in which the motor operates. Further, EQS actuators require mechanical accuracies such as very smooth surfaces Otherwise, electric field concentration at asperities on the electrode surface induce localized field emission or corona-discharge at very low average electric fields and thus further limit the electric field strength. Such limitations similarly present difficulties in the application of electrostatic actuators to micro systems.

SUMMARY OF THE INVENTION

The invention disclosed in the related application provides a microactuator with an EQS drive. The actuator is referred to as a motor. Applicants have found that micromachining techniques enable the making of small gaps and very smooth surfaces which overcome voltage breakdown of the electroquasistatic field and localized field emissions problems of the past. This in turn enables the generation of high strength electric fields and high torque densities which form large actuating forces.

Because torque is proportional to surface area actually excited, the related application discloses embodiments which employ what is called a top-drive or axial gap design. In the top-drive design, the stator is positioned for operation in planes parallel to the plane in which the moving member moves. In particular, the stator is positioned for operation in a plane above (by a micron amount) the plane of the moving member. Hence, the moving member operates within the stator across a micron wide gap. To fabricate such a top-drive microactuator, the related application discloses a fabrication process in which two structural layers are alternately deposited and patterned between two sacrificial layers in a vertical arrangement on a silicon substrate. The sacrificial layers are subsequently etched and their absence forms the desired micron-wide gap between two structural members (the moveable member and stator) patterned respectively from the two structural layers. Where the moveable member is circularly shaped, a self-aligned center bearing is fabricated along with the stator from the upper structural layer.

The present invention provides a side-drive or radial gap design of the electrostatic microactuator to overcome the disadvantages of the top drive design. Particularly, the side driven moveable member overcomes many of the inherent limitations both in operation and fabrication of the top driven moveable member. The vertical instability of the top driven moveable member is transformed by the present invention into a lateral instability which can be easily and effectively restrained by a passive central bearing. The need for fine planarization, accurate alignment, and insulating bushings or spacers is eliminated by the present invention. Furthermore in the present invention side-drive design, the entire top surface of the moveable member is free for applications without the periodic occlusion of the stators. For example, sensors such as charged-coupled devices (CCD's) could be built directly onto the surface of the moveable member with complete lateral freedom of movement, or sensors could be positioned in the substrate with the moveable member serving as a shutter.

The present invention comprises a moveable member, such as a plate or a rotor, positioned for lateral movement in the same plane in which the stator operates. Specifically, the moveable member and stator are spaced apart from each other in a common plane such that a small gap is formed between a side edge of the stator and a side edge of the moveable member. The distance between the moveable member and the stator across the gap is on the order of about 1 micron which is sufficiently small to support voltages up to about 100 volts without breakdown. An electrostatic field is generated across the gap between the moveable member edge and the stator and thus moves the moveable member within the common plane.

The moveable member, stator and small gap are fabricated by micromachining techniques of the present invention. Generally, the fabrication process includes the provision of a first structural layer patterned over a first sacrificial layer on a substrate. The first structural layer is patterned to form a first and second member separated across a micron wide gap from each other in a common plane. Electrostatic means are incorporated and the first sacrificial layer is etched such that the first member is freed and serves as a moveable member with respect to the second member. The second member is connected to the substrate during patterning of the structural layer and serves as the stator. The electrostatic means enable selective generation and sustaining of an operational strength electrostatic field across the gap between the moveable member and stator.

In a preferred embodiment, the moveable member, stator, and small gap are microfabricated in a common plane through a monolithic process. A first sacrificial layer is deposited onto an insulating substrate which has a conductive shield thereon. The sacrificial layer is patterned (masked, etched, etc.) as needed. A structural layer is deposited over the first sacrificial layer. The structural layer is patterned to form the stator and moveable member in the same plane and spaced micrometers apart from each other in the plane. The sacrificial layer is etched to detach the moveable member from the substrate such that the moveable member is moveable with respect to the stator in the plane under subsequently generated electrostatic field forces.

In an alternative microfabrication process, channels are etched through one side of a silicon wafer or similar structural layer to outline the stator and moveable member positioned across a gap. Similar outlines of the body of a center bearing may also be formed. A sacrificial layer is deposited over the one side of the silicon wafer to seal the channels. The silicon wafer is then inverted and the sacrificial layer connected to a substrate. The opposite side, now an upper exposed surface, of the silicon wafer is ground down to the ends of the channel to form the stator and moveable member spaced apart in a common plane. In the case where a center bearing body was previously outlined, the bearing body is formed spaced apart from the moveable member in the common plane. The sacrificial layer is then etched to free the moveable member for movement in the plane with respect to the stator and about the bearing. To optionally provide a cap or top to the bearing, a second structural layer is deposited and patterned on the bearing body before the sacrificial layer is etched. In another alternative microfabrication process, local oxidation of silicon (LOCOS) processing is employed. In particular, a groove is etched in a substrate. A sacrificial layer is provided in the etched groove of the substrate. In the preferred embodiment, the sacrificial layer is an oxide layer grown in the groove by local oxidation. A structural layer is deposited and patterned over the substrate and sacrificial layer to form a stator connected to the substrate and a moveable member positioned over the groove and spaced from the stator in a common plane. The sacrificial layer is etched to free the moveable member for movement in the common plane with respect to the stator. In accordance with the present invention, during fabrication the moveable member may be patterned to be circular in shape. In turn, the stator is circumferentially positioned about the moveable member. A bearing may be provided to limit lateral and/or vertical movement of the moveable member. The bearing may include side or center bearings or a combination thereof. Such bearing are generally formed by the deposition of a second sacrificial layer over at least the moveable member. A second structural layer is then deposited and patterned over the second sacrificial layer to form a bearing connected to the substrate or the stator. Etching of the first and second sacrificial layers is then performed together.

Further, bushings may be formed in the moveable member to prevent settling of the moveable member on the substrate. Also during fabrication, the substrate may be coated with an insulating layer before structural and sacrificial layers are deposited over the substrate.

In another embodiment of the present invention, a harmonic side drive micromotor is provided. In particular, the moveable member is circular in shape and the stator is circumferentially positioned about the moveable member. The moveable member and stator are positioned to operate in the same plane. A center bearing is employed in the center of the moveable member. Clearance between the moveable member and the center bearing may be relatively large such that the moveable member makes contact with the stator as the moveable member rolls about the circumferencing stator under generated electrostatic field forces. Alternatively, the clearance between the moveable member and center bearing may be less than the clearance between the moveable member and stator such that contact is made between the moveable member and center bearing during movement of the moveable member about the circumferencing stator.

In the case where a center bearing is not employed, a bearing may be formed as a vertical and overhanging extension of the stator to prevent or limit vertical movement of the moveable member with respect to the substrate.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

The related application discloses that electrostatic fields of operational strength (above $10^8$ V/m) can be generated and sustained without electrostatic breakdown in atmosphere-micron pressure spacings between conducting plates.

Preferably, the pressure spacing is below about $5 \times 10^{-3}$ bar mm; that is, at atmospheric pressure the spacing should be less than 5 microns. Even lower spacing is preferred, and a spacing of 1.5 microns has been used successfully. This is accomplished by micromachining techniques which enable perfected surface characteristics and requisite micron pressure-spacings to be achieved. Thus, an electrostatic micromotor in the micron regime is possible.

The present invention makes such an electrostatic machine very practical as well as possible. The present invention discloses a side drive (radial gap) configuration for the electrostatic micromotor in contrast to the top-drive (axial gap) configuration of the related application. As previously mentioned in the top-drive configuration of the related application, the stator is vertically spaced from the moveable member, i.e. positioned in a plane above the plane in which the moveable member moves. Although that arrangement theoretically provides the largest torque for moveable members with a large aspect ratio of radius to thickness, various disadvantages in both operation and fabrication exist.

One disadvantage is the inherent instability of the top-drive configuration with respect to movements of the moveable member along the axis (z-axis) perpendicular to the plane in which the stator lies. In particular, the finite overlap of the moveable member and stator prescribe fringing fields which generate a z-directed force which attracts the moveable member to the nearest surface (stator surface or substrate surface). Further, there are no electrostatic restoring forces which act to center the moveable member within the stator along the z-axis. Therefore, any z-directed perturbation away from the center, at which z-directed forces cancel, will cause the moveable member to be unstable.

To prevent the moveable member from colliding with the stator, an active control system may be employed to sense the moveable members position and compensate for any z-directed drifts. However, that approach presents difficulties in measuring the very small phase capacitances at rates beyond the high bandwidths envisioned for the motor's operation. Otherwise, a mechanical bushing could be inserted into the structure to limit this movement. However, the friction caused by this bushing will significantly lower the top speed of the moveable member and may not allow any rotation at all due to friction.

A center bearing is required to prevent a circular shaped moveable member from moving radially into non-centering regions (i.e. up against the base of the stators), either before the centering fields are introduced (i.e. before the power is turned on) or from a large radial disturbance during operation. Such contact would either inhibit the moveable member due to the large frictional forces which would result, or in the case where the moveable member and stator are purely conducting, would short out two adjacent stators catastrophically. An electrostatic centering force will also provide a positive pressure on a misaligned bearing. For the top driven configuration, the gap between the bearing and moveable member must be larger than any misaligned gap tolerance between the moveable member and stator to keep the moveable member from grinding the bearing.

The overhanging stator pieces in the top-drive design present other disadvantages. First a fine planarization of the sacrificial layer is required before depositing the second structural layer from which the stator is formed, especially considering the very fine gap tolerances envisioned. This requires the deposition of a very thick (a few microns) second sacrificial layer. Second, the long overhanging portions of the stator will mechanically resonate much below the desired frequency regime of the micron scale motor as they are alternatively pulsed and deflected toward the moveable member. This resonance is greatly exacerbated by the long stator overhangs required to utilize the full surface potential of a two-dimensional moveable member. Without active control, this resonance would provide an upper limit on the attainable angular frequency of the top driven moveable member. Furthermore, the maximum overhang length also limits the ultimate size of a top driven configuration with a fully utilized moveable member surface.

The present invention side drive design overcomes the foregoing problems as described next with reference to the figures and particular embodiments. It is understood that various arrangements and shapes of stators and moveable members are possible and are within the ability of those skilled in the art. Thus, the following description of embodiments is illustrative and not for purposes of limitation of the present invention. Further, the generation of an electrostatic field and considerations with respect to power and drive of the embodiments are as discussed in the related application and herein incorporated by reference. Although a variable capacitance scheme may be referred to from time to time hereafter, it is understood that alternative schemes may be employed as in the preview of those skilled in the art.

Figure 1A:
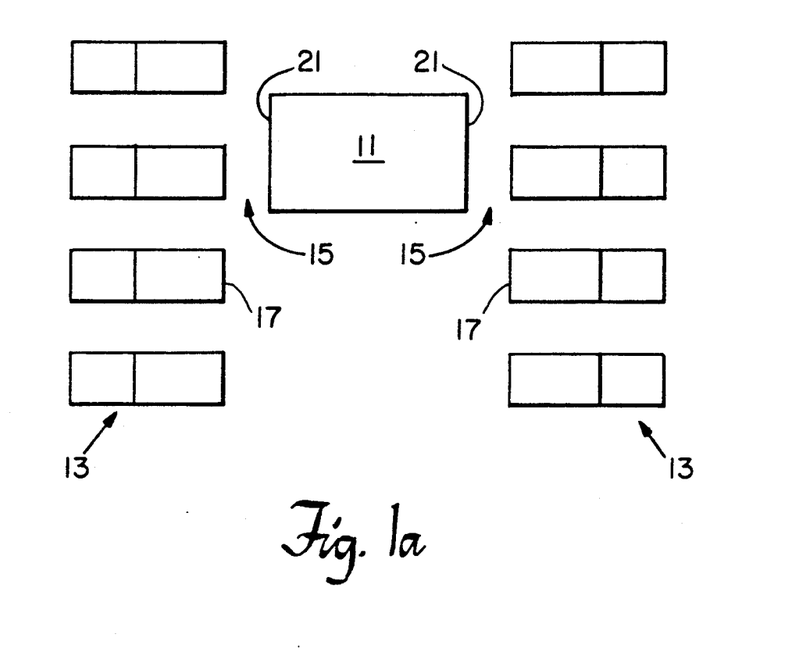
FIG. 1a is a plan view of an embodiment of the present invention with a linearly traveling moveable member.

FIGS. 1a-2b illustrate two basic embodiments of the present invention. FIGS. 1a-1b illustrate an electrostatic micromotor with a laterally travelling moveable member 11 between two rows of stators 13 where the moveable member 11 travels in the plane of operation of the stators 13. More specifically, the moveable member 11 is positioned in a plane parallel to and above the plane of the substrate 19 having an isolation layer 20. On opposite sides of the moveable member series of stators 13 are positioned in two parallel rows which outline the pathway of possible travel of the moveable member 11, Each stator 13 of one row is aligned across the pathway with a stator 13 of the other row, and the pairs of stators 13 face each other across the pathway (or inwardly).

Figure 1B:
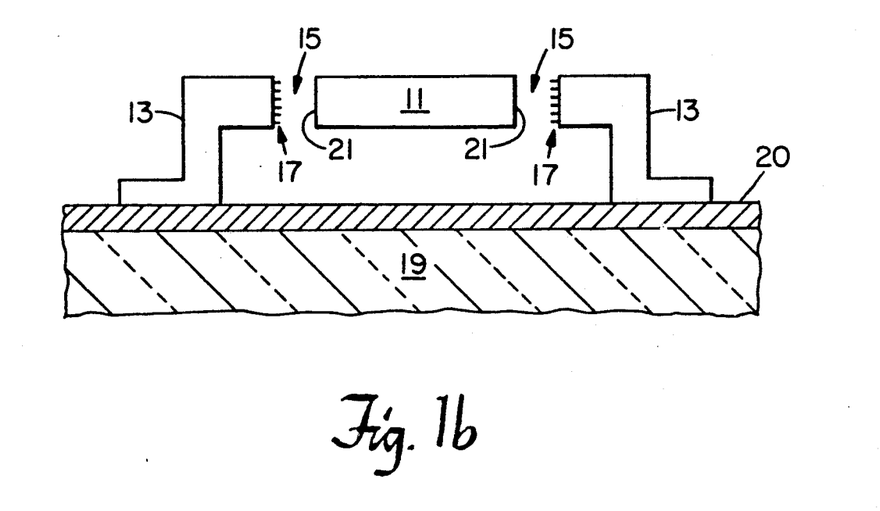
FIG. 1b is a side view of the embodiment of FIG. 1a and shows that the moveable member and stator operate in a common plane.

The stator facing edges 21 of the moveable member 11 are spaced across micron wide gaps 15 from electrode bearing ends 17 of the stators 13 in the plane of the moveable member 11, as illustrated in FIG. 1b. An electrostatic field is generated across the micron wide gaps 15 between electrodes of the stator 13 and the edges 21 of the moveable member. This is accomplished by the electrodes being charged in sequence such that the moveable member 11 slides along the path formed between the two rows of stators 13.

The micron wide gap 15 and perfected surfaces of the stator 13 and moveable member 11 enable the electrostatic field to be sustained at operational strengths without breakdown and in turn to sustain lateral movement of the moveable member 11 levitated about 1 micron above the substrate 19. Preferably, the moveable member is a 2 to 10 micron thick plate formed of a conducting material. However, alternatively the moveable member may carry electrodes near its edges 21. Gaps 15 are preferably about 1-5 microns wide.

Figure 2A:
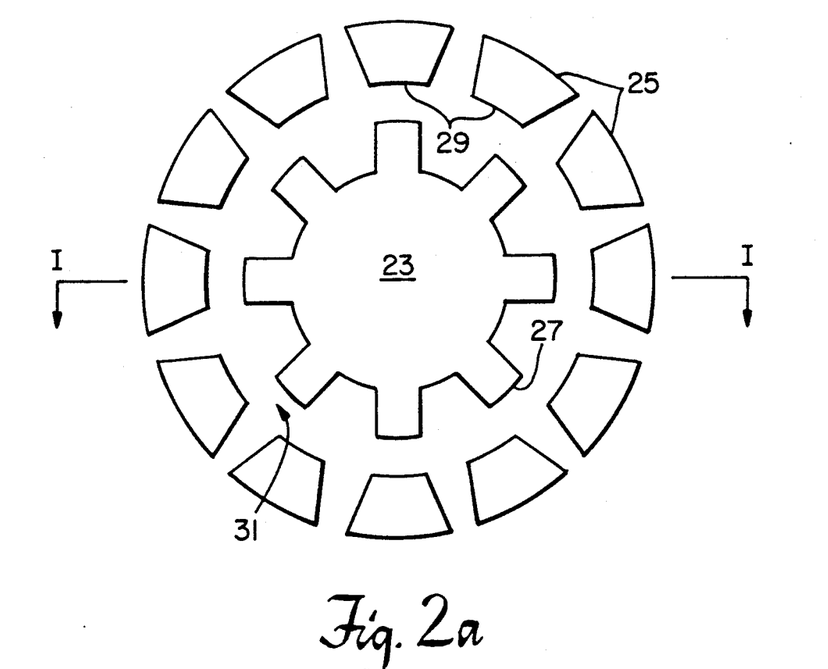
FIG. 2a is a plan view of another embodiment of the present invention with a rotary moveable member.
Figure 2B:
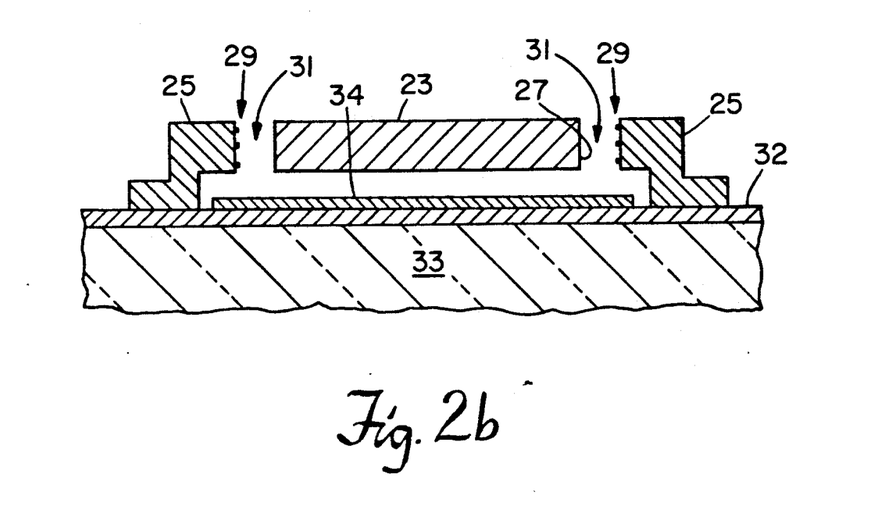
FIG. 2b is a cross-section of the embodiment of FIG. 2a through line I—I.

The embodiment shown in FIGS. 2a and 2b employs a circular shaped moveable member or a rotor 23. The stators 25 are circumferentially positioned about the rotor 23, and the rotor 23 lies in the plane of the electrode bearing ends of stator 25. The stator is formed on an isolation layer 32 of a substrate 33. The stator facing edges 27 of the rotor 23 are spaced across a micron wide gap 31 from the electrode bearing ends of the stators 25. Like the embodiment of FIGS. 1a-1b, the rotor 23 may be formed of an electrically conducting material or alternatively may carry electrodes along its edges 27. As the stator electrodes are charged in sequence, an electrostatic field is generated between the electrodes 29 of the stator 25 and the edge 27 of the rotor 23 across micron wide gap 31 in the common plane. The electrostatic field generates forces between the stator 25 and rotor edge 27 which causes the rotor to rotate about the rotor's center and to be levitated above the substrate 33. A conductive shield plate 34 is positioned under the rotor 23 and extends partially under the stator. The plate 34 shields the rotor from the substrate electrostatically.

Figure 3A:
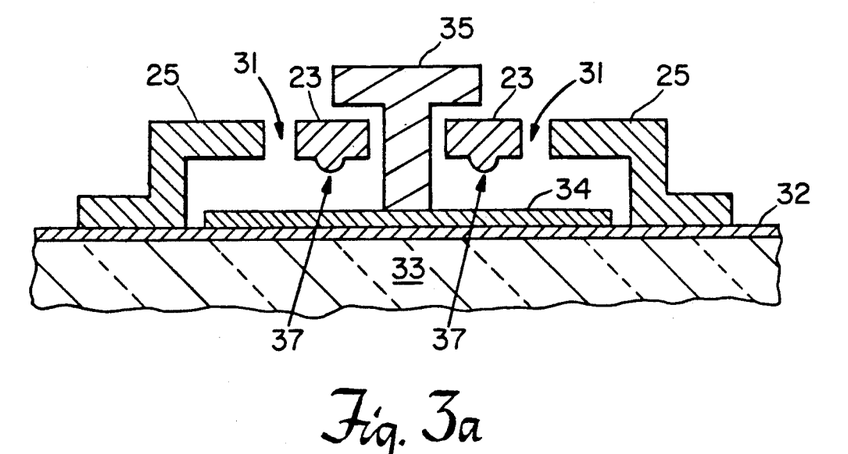
FIG. 3a is a cross-section of an embodiment of the present invention with a rotary moveable member and a center bearing for limiting lateral and vertical movement of the moveable member.

To prevent lateral movement of the rotor 23 in FIGS. 2a-2b a central bearing 35 may be employed as illustrated in FIG. 3a. The bearing 35 may be wider at an upper portion than at its base to further provide a limitation on vertical movement of the rotor 23, Also, to prevent the rotor 23 from settling on the substrate, bushings 37 may be incorporated in the underside of rotor 23 as illustrated in FIG. 3a.

Figure 3B:
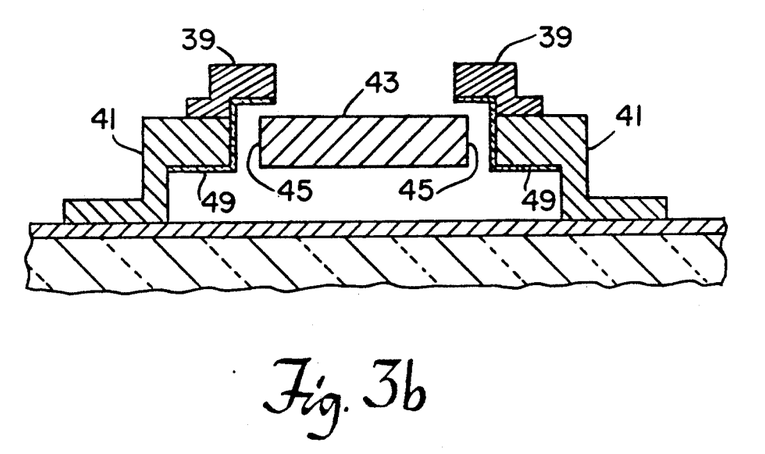
FIG. 3b is a cross-section of another embodiment of the present invention which employs side bearings that extend from the stator to limit vertical movement of the moveable member.

As an alternative to a central bearing 35 (FIG. 3a), side bearings 39 may be employed as illustrated in FIG. 3b. The side bearings 39 extend upwardly and inwardly from upper portions of the stators 41 to limit vertical movement of the rotor or moveable member 43, Similar side bearings may be employed in the embodiment of FIGS. 1a-1b. In either case, the arrangement presented by the side bearings 39 allows for actual contact to be made between the stator facing edges 45 of the moveable member/rotor 43 and upper portions of the stator 41. Such contact produces short circuiting, thus a thin insulator layer 49 along the underside of the side bearing and inward facing contour of the stator 41 is required. Preferably, insulator layer 49 is silicon nitride.

Figure 4A:
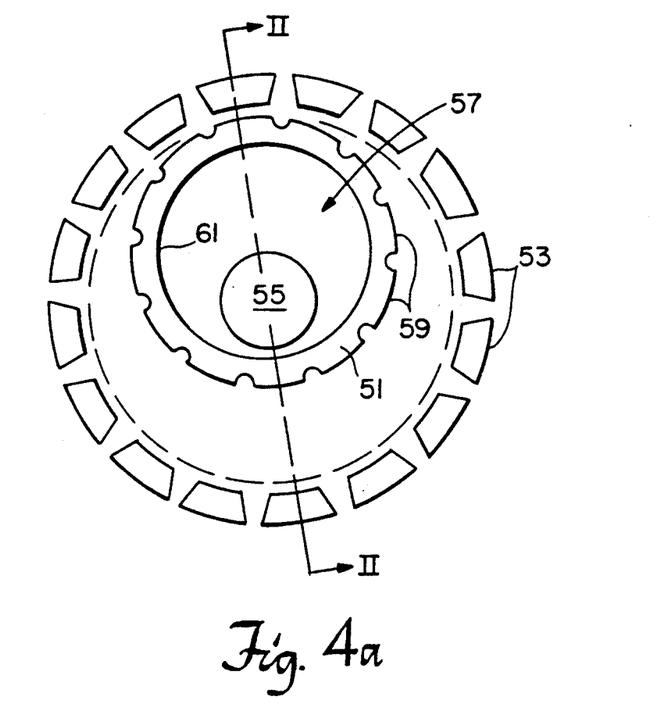
FIG. 4a is a schematic view of another embodiment of the present invention.
Figure 4B:
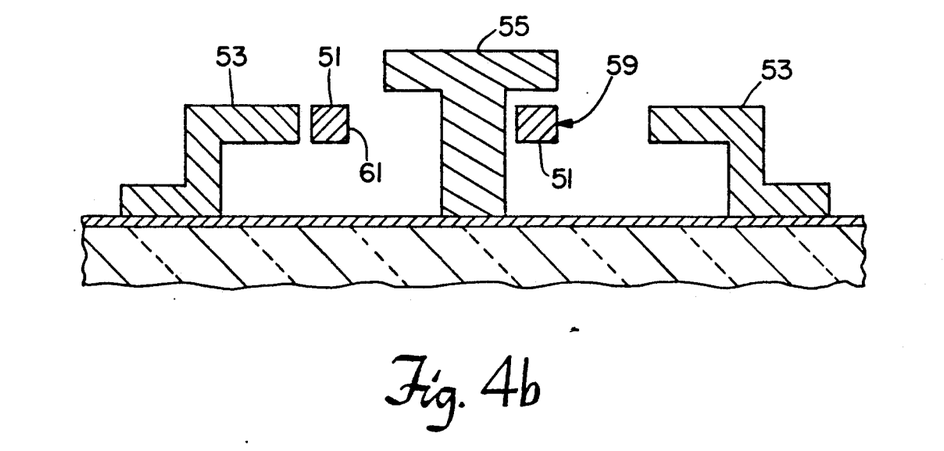
FIG. 4b is a cross-section through line II—II of FIG. 4b.

FIGS. 4a-4b illustrate another embodiment of the present invention which is generally known as a harmonic side drive electrostatic motor. That embodiment employs a circular shaped moveable member or rotor 51 within a circle of stators 53. The rotor 51 has a central opening 57 which accommodates a center bearing 55 positioned in the center of the circle of the stators 53. The edge 51 of the central opening 57 of the rotor 51 rolls about the center bearing 55 as the outer edge 59 of the rotor 51 rotates about the circle of stators 53. The rotor 51 is driven by an electrostatic field which is generated between outer edges 59 of the rotor 51 and electrode bearing sides of the stator 53, all of which are in a common plane.

Depending on the clearance between the center bearing 55 and the rotor 51 (i.e, edge 61 of the central opening 57 thereof), contact is either made between the stators 53 and rotor outer edges 59 or between the central opening edge 61 and center bearing 55. That is, if the clearance between the edge 61 of the rotor central window 57 and the center bearing 55 is less than the clearance between the rotor outer edge 59 and stator 53 contact is made between the rotor 51 and center bearing 55 during generation of the electrostatic field and, hence, during rotation of the rotor 51 about the stators 53. On the other hand, if the clearance between the edge 61 of the rotor central opening 57 and the bearing 55 is greater than the clearance between the outer edge 59 of the rotor 51 and the stators 53, actual contact will not be made between the rotor 51 and center bearing 55 during rotation of the rotor 51 within the circle of stators 53. Instead, contact will be made between rotor outer edge 59 and stator 53, In this case, an insulating layer over the inward facing side (electrode bearing end) of the stator 53 is required as previously discussed.

FIGS. 5a-5f, FIGS. 6a-6f and FIGS. 7a-7f provide illustrations of various fabrication processes of the present invention. The various steps and techniques employed and illustrated are understood to apply to embodiments with laterally travelling moveable members as well as embodiments employing circular shaped moveable members or rotors. Although the illustrated methods of fabrication are particular to the use of silicon technology, it is understood that other materials and respective techniques are suitable.

Figure 5A:
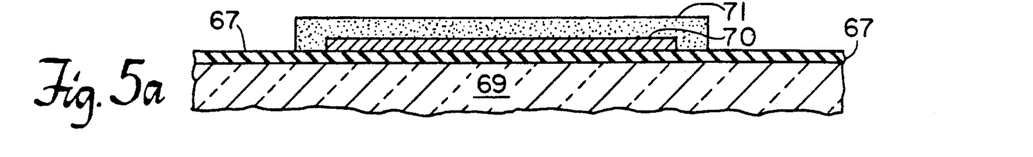
FIGS. 5a–5f are schematic views illustrating the fabrication process of the embodiments of the present invention.
Figure 5B:
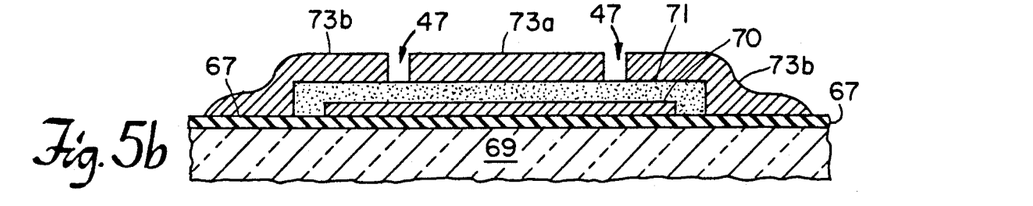

A basic micromotor fabrication process of the present invention is illustrated in FIGS. 5a-5f. In a first step, a substrate 69 is prepared with an insulator (silicon nitride) layer 67 deposited and patterned thereon. A conductive shield 70 is deposited and patterned on the insulator. Next, a first sacrificial layer 71 is deposited and patterned over the substrate 69. As shown in FIG. 5b, a first structural layer 73 is deposited and patterned over first sacrificial layer 71 and insulating layer 67 on the substrate 69. The pattern includes the stator 73b and moveable member 73a separated from each other by micron wide gaps 47. The substrate 69 of FIG. 5b is immersed in a selective etchant which removes the sacrificial layer 71 and frees the moveable member 73a to provide the embodiments of FIGS. 1a-1b or 2a-2b.

Figure 5C:
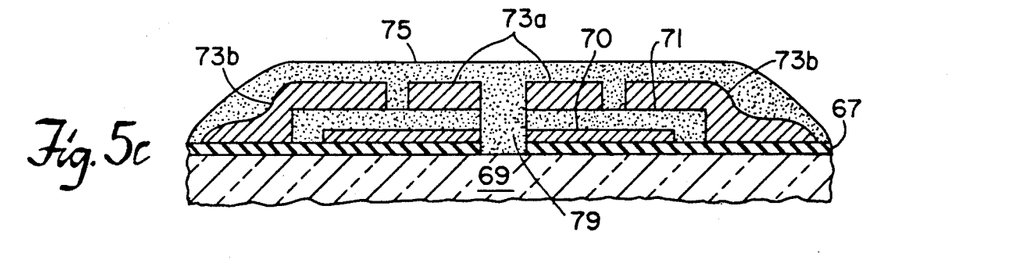

If a center bearing is desired as in the embodiments of FIGS. 3a and 4a, the etching of FIG. 5b is not immediately performed, and the following steps are added. A circular window 79 is etched through the moveable member structural layer 73a and first sacrificial layer 71 to the substrate 69 as shown in FIG. 5c. This is preferably accomplished by successive dry etching steps. A second sacrificial layer 75 is deposited into the etched window 79 and over the first structural layer 73 also shown in FIG. 5c.

The second sacrificial layer 75 defines the gap between the center bearing and the rotor 73a. The circular window 79 must be etched as a true circle to within the thickness of the gap defined by the second sacrificial layer 75 if the rotor 73a is to turn freely. It is also critical in the rotor patterning step of FIG. 5b to minimize the eccentricity of the rotor 73a in order to suppress rotational instability.

Figure 5D:
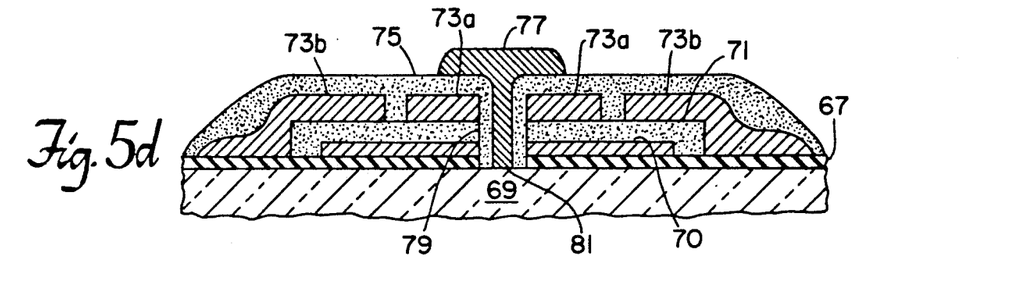

A second window 81 is cut through the second sacrificial layer 75 to the substrate 69 in the center of the window area 79 filled by second sacrificial layer 75 as shown in FIG. 5d. The bearing is attached to the substrate 69 through the second window 81 by a second structural layer 77 being deposited over the second sacrificial layer 75 as shown in FIG. 5d. The second structural layer 77 is also patterned to form the desired shape of the upper portion of the bearing. Thereafter, the substrate 69 of FIG. 5d is immersed in a selective etchant which removes the first and second sacrificial layers 71, 75 freeing the rotor 73a as shown in the embodiments of FIGS. 3a and 4a.

Figure 5E:
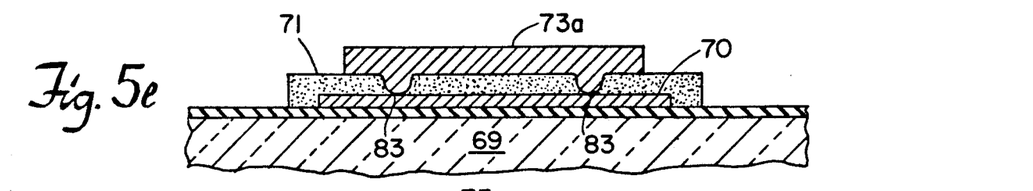

To provide bushings incorporated in the moveable member or rotor 73a, before the patterning of the first structural layer 73 in FIGS. 5a and 5b, the first sacrificial layer 71 is etched to outline the bushings. The first structural layer 73 is then (a) deposited over the etched first sacrificial layer 71, and (b) patterned to form the moveable member 73a over the etched areas such that bushings 83 are incorporated into the moveable member as illustrated in FIG. 5e.

Figure 5F:
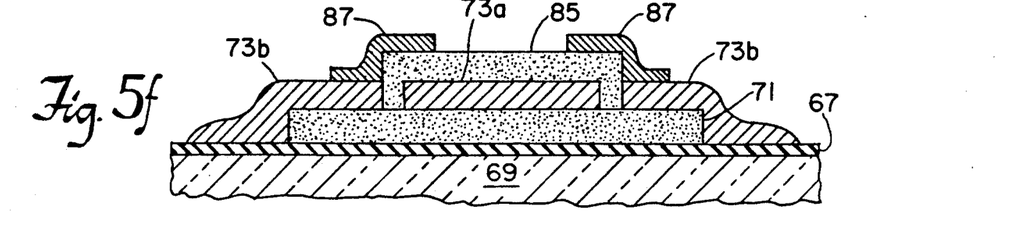

If side bearings are desired, after the patterning and depositing of first structural layer 73 in the step of FIG. 5b, a second sacrificial layer 85 is deposited over the portion of the first structural layer 73a which forms the moveable member as shown in FIGS. 5f. A second structural layer 87 is then deposited and patterned over the second sacrificial layer 85 to form the side bearings connected to the first structural layer 73b stator portions. Thereafter, the etching of the first and second sacrificial layers 71, 85 frees the moveable member to form the structure of the embodiment of FIG. 3b. Thereafter, insulating layer 49 (FIG. 3b) is deposited on the underside and moveable member facing sides of the bearing and upper stator portions.

To prevent electrostatic clamping of the rotor to the shield, electrical contact between the rotor and shield, either through the bearing or bushings, should be provided. The rotor, bearing and shield may be heavily doped polysilicon. To assure electrical contact between the elements, native oxide of polysilicon must be minimized. To that end, the current release method consists of 15 minutes in a 49% (by weight) HF solution, 2 minutes in a DI rinse, 5 minutes in a 1:1 $H_2SO_4$:$H_2O_2$ (pirana) clean, 10 minutes in a DI rinse, 30 seconds in the HF solution, 90 seconds DI rinse, and a nitrogen dry. The initial 15 minute oxide etch in HF is required to release the various motors on the die. The 5 minute pirana clean is effective in cleaning the exposed polysilicon surfaces from organic as well as ionic contaminants. The second HF etch removes the thin oxide formed on the polysilicon surfaces during the pirana clean. The final DI rinse time is critical. Rinse times under 60 seconds often lead to rotor stiction problems and do not produce reliable results. For final DI rinse times under 60 seconds, the stiction problem is aggravated with shorter rinse times. Long rinse times may be detrimental since the native oxide growth rate is greater in DI water than in air. A 90 second rinse time has been typically used in work with good results.

The pirana clean and its associated steps are used in the current release process for further surface cleanliness. Successful motor operation is still achieved by simply releasing the devices in HF for 15 minutes and rinsing them in DI water for 90 seconds. However, the resulting polysilicon surfaces are not as clean. With the pirana clean included in the release process, we have achieved reproducible results.

The electrodes for the variable capacitance scheme or other circuitry for drive and sensing schemes are readily incorporated into the foregoing microfabrication process. Rotor electrodes can be encapsulated as a single layer deposited and patterned at the outer edges of the moveable member structure 73a on an insulating structural layer. A second insulating layer is then deposited and patterned to complete the moveable member.

Alternatively, the moveable member is a composite of dielectric and conducting films deposited and patterned with the patterning of the first structural layer 73a.

Stator electrodes are deposited and patterned on subject upper ends of the stator structure formed from the first structural layer 73b. Brushes or sensing elements are fabricated during deposition of the insulator layer 67 and/or first sacrificial layer 71, or during deposition and patterning of the first structural layer 73 forming the stators depending on the respective design of the brushes or sensing scheme.

FIGS. 6a-6f disclose an alternative fabrication process for embodiments of the present invention. The disclosed process is also suitable for fabrication of other structures especially thick structures without the associated lithographical problems inherent to surfaces with gross irregularities. The disclosed process incorporates a dielectric isolation (DI) technique for creating Silicon-On-Insulator (SOI) structures. This process further generates structures in single crystal silicon (SCS) as opposed to polycrystalline silicon which results from deposition. Such a stress neutral, high quality SCS layer allows electronic devices such as transistors or sensors to be built directly into the structures.

Figure 6A:
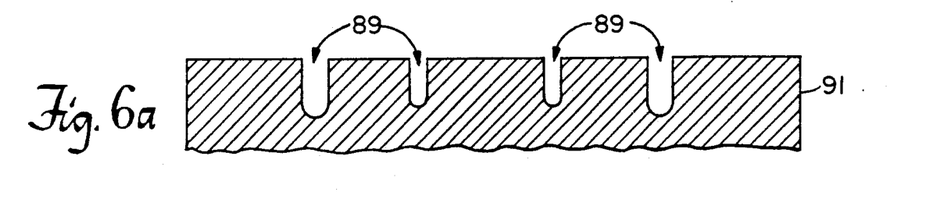
FIGS. 6a–6f are schematic views illustrating an alternative fabrication sequence for embodiments of the present invention.

Referring to FIG. 6a, channels 89 are anisotropically etched in a standard silicon wafer or other structural layer 91 to outline a rotor, stator and center bearing as desired. The channels 89 are etched to a depth greater than the desired rotor thickness. It is understood that channels 89 to outline a stator and a moveable member without a center bearing would be etched for micromotors of the non-rotary type (FIGS. 1a-1b) and the type without a center bearing (FIGS. 2a-2b).

Figure 6B:
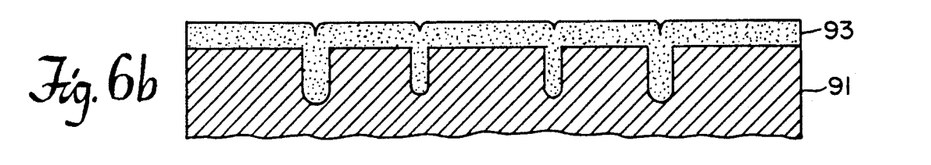
Figure 6C:
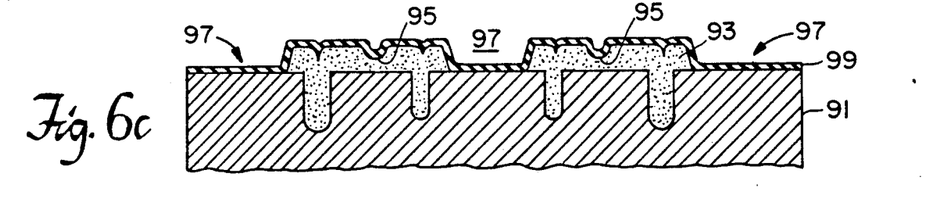

A first sacrificial layer 93 is then deposited to seal the thin channels 89 etched in the previous step and cover the surface of the wafer 91 as illustrated in FIG. 6b. With a timed etch, depressions 95 for bushings are isotropically cut into the first sacrificial layer 93 as shown in FIG. 6c. The round bottoms of the isotropic cut ultimately form the top of a bushing support surface and will reduce the rotor's surface contact to the housing when the rotor is at rest, minimizing any possible sticking effects between these surfaces. Stator and center bearing supports are then defined by removing regions (at 97 of FIG. 6c) of the sacrificial layer 93, exposing the supporting wafer 91. A thin insulating layer 99 (e.g. silicon nitride) is then deposited over the entire surface as shown in FIG. 6c.

Figure 6D:
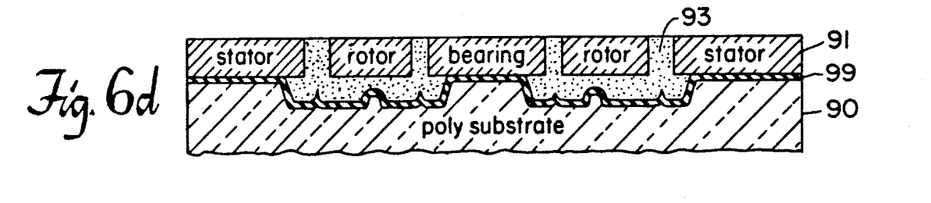

The dielectric-isolation SOI process is then employed to transfer the top section of the wafer 91 upside down onto a polysilicon substrate 90. This process consists of depositing about 500 microns of polysilicon onto the nitride insulating layer 99 side of the wafer 91. The wafer 91 is then inverted such that the side opposite the side through which the channels 89 were etched becomes an upper surface. The wafer 91 is ground away from the opposite side toward the ends of the channels 89. The grinding is performed to a specified depth and the remaining surface is then polished to a smoothness comparable to a commercially available silicon wafer. The resultant structure consists of a completely planar patterned SCS layer 91 on top of and electrically isolated from a supporting polysilicon substrate 90 as shown in FIG. 6d.

Figure 6E:
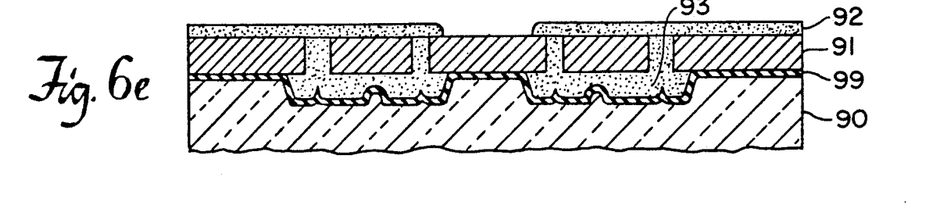
Figure 6F:
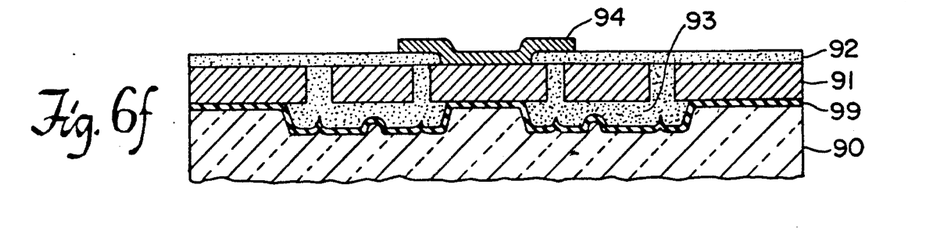

All that remains to complete the side driven micromotor is to cap the rotor and then remove any remaining sacrificial layers. The cap must prevent the rotor from floating free of the structure during the sacrificial layer etch and in subsequent handling. During motor operation the electrostatic field will vertically center the rotor. The cap is produced by depositing a second sacrificial layer 92 on the first structural layer 91. The second sacrificial layer 92 is patterned, and removed over the center bearing portion of the first structural layer 91 as illustrated in FIG. 6e. A thin second structural layer 94 is then deposited and patterned to slightly overhand the rotor, thus preventing its escape, while being connected to the central bearing as illustrated in FIG. 6f. Finally the sacrificial layers 92, 93 are removed, preferably by a chemical etchant, freeing the rotor and completing the micromotor structure.

It is understood to be within the perview of one skilled in the art to apply the foregoing process to different stator rotor arrangements of a micromotor with or without a bearing (center or side). Side bearings would be fabricated by patterning the second sacrificial layer 92 such that portions of the stator closest to the rotor are exposed. The second structural layer 94 is then deposited and patterned to form a bearing connected to the exposed portions of the stator and overhanging the outer edges of the rotor.

Incorporation of electrodes or other circuitry for drive and sensing schemes is then as discussed previously for FIGS. 5a-5f.

The thickness and variation of the SCS layer in the fabrication process of FIGS. 6a-6f are a function of the precision of the grinding machine and the uniformity of the original silicon wafer 91 used. To that end, first structural layers 91 as thin as two microns and as thick as ten microns are achievable.

While vertical sidewalls in the etching of the channels 89 are desired for a maximal performance of the edge driven micromotor, the fabrication process of FIGS. 6a-6f is otherwise insensitive to process variation in the channel 89 etching and wafer 91 grinding steps. Since the SCS (first structural) layer 91 is ground to a thickness defined to be less than the channel 89 depth, the increased sidewall slope often present near the base of the channel 89 can be removed, leaving more parallel sidewalls throughout. The sensitivity to non-uniformities in channel 89 depths can be eliminated by assuring that the SCS (first structural) layer 91 is ground to a thickness less than the shallowest channel 89. Furthermore, while variations in the first structural layer 91 thickness due to grinding inaccuracies change rotor thickness, as long as the SCS layer 91 is ground to at least the base of the shallowest channels 89, all rotors will still be perfectly functional. These insensitivities to channel and grinding depth are extremely important to the ease and yield of micromotor fabrication as neither of the steps are self-terminating.

Since the polysilicon substrate 90 is deposited in compression, some stress relief is necessary to prevent the thin, otherwise stress neutral first structural layer 91 from cracking or fracturing under the strain induced by the thick polysilicon substrate 90. Standard DI processes employ V-groove etches refilled with oxide to relieve stress. These grooves also define islands of SCS which are electrically isolated. In the process of FIGS. 6a-6f the channels 89 used for delineating the rotor, stator and central bearing also serve these purposes.

Figure 8A:
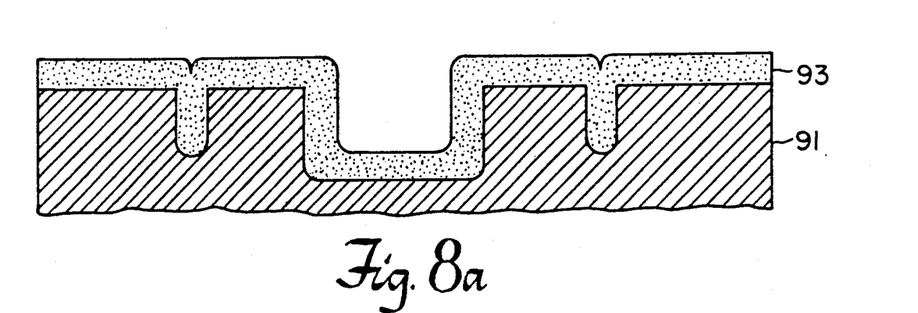
FIGS. 8a–8d are schematic views illustrating a chunk planarization technique employable in the fabrication process of FIGS. 6a–6f.
Figure 8B:
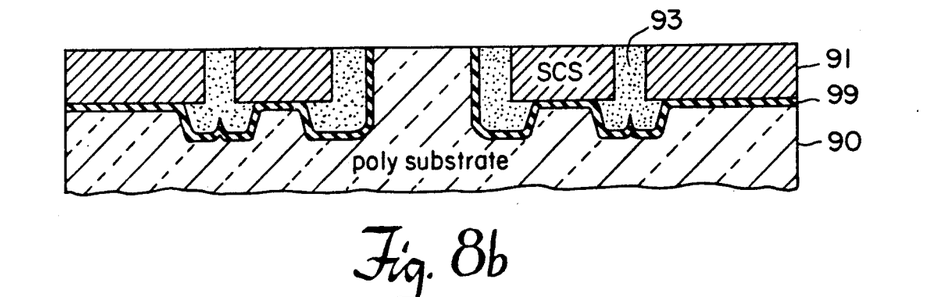

For motor structures requiring a salient rotor (e.g. the variable capacitance motor) or any structures requiring large areas of the SCS (first structural) layer 91 to be removed, additional details follow. The first sacrificial layer 93 deposition will not fill, to the surface, wide channels 89 cut into the silicon wafer 91 as illustrated in FIG. 8a. The subsequent thick polysilicon deposition 90 will then fill into the wide channel regions, eliminating the first structural layer 91 spaces as shown in FIG. 8b. This effect can be useful, for example, for creating a self-aligned center bearing.

Figure 8C:
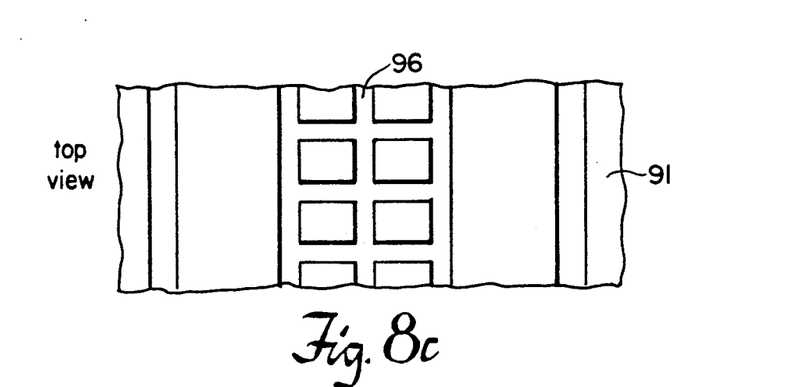
Figure 8D:
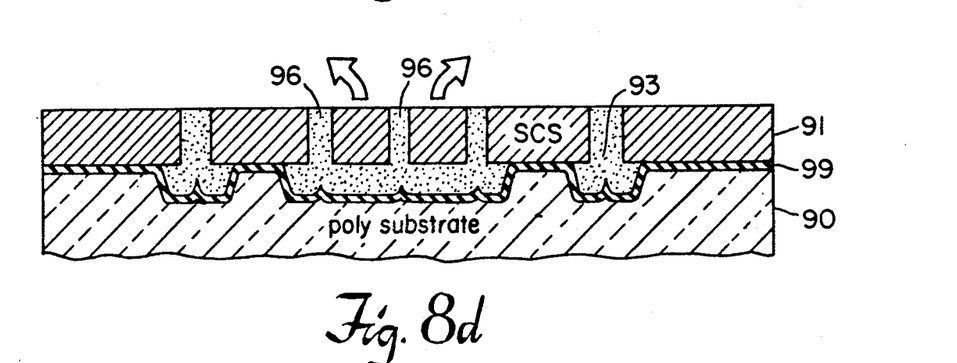

Alternatively to provide large spaces in the first structural layer 91, the following technique is employed, instead of etching away large unwanted regions of the first structural layer 91. In a large region of the first structural layer 91, thin fillable trenches 96 are cut to criss-cross the entire unwanted region as shown by the plan view of FIG. 8c. During the etching of the sacrificial layers 92, 93, chunks of the first structural layer 91 which are entirely surrounded by the trenches 96 and not attached from the backside will float free into the etch solution leaving the desired large space as shown in FIG. 8d. It is noted that care must be taken to prevent these chunks from depositing onto the wafer 91 surface.

After the step of FIG. 8d, the embodiments of FIGS. 1a–1b and 2a–2b are provided with an internal window through the moveable member. Also provided from the step of FIG. 8d is the stator and rotor arrangement of the embodiments of FIGS. 3a and 4a. Fabrication of a center bearing is then similar to the steps of FIGS. 5c–5d. Briefly, a second sacrificial layer is deposited over the first structural layer 91. A central opening is etched in the second sacrificial layer to accommodate the bearing and to expose a portion of the substrate. A second structural layer is deposited and patterned in the central opening and over the second sacrificial layer to form the desired center bearing. Lastly, the sacrificial layers are etched away.

Figure 9A:
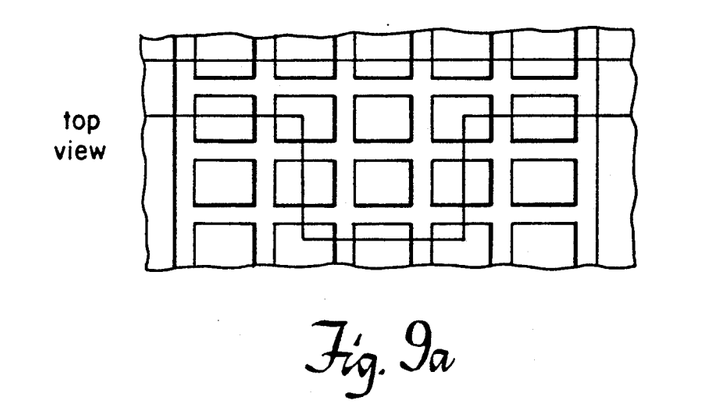
FIGS. 9a–9b are a plan view and cross-section of a planar free standing structure made by the chunk planarization technique of FIGS. 8a–8d.
Figure 9B:
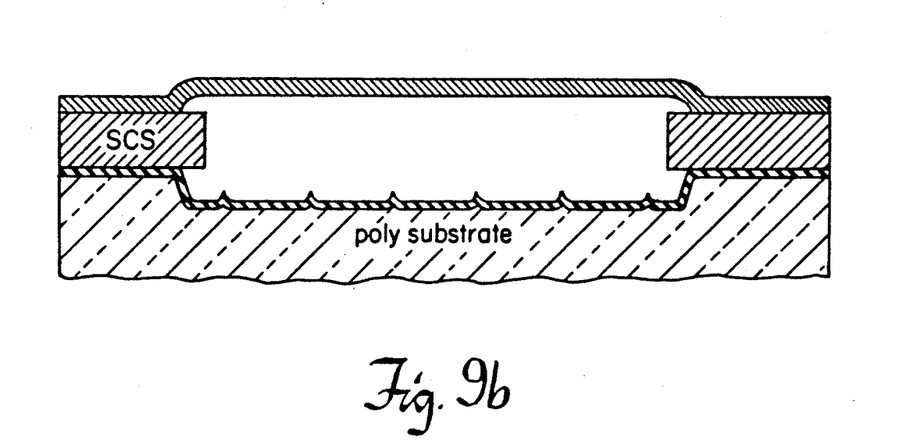

The above chunking away of parts of the first structural layer 91 (FIGS. 8a–8d) may also be used to generate free standing structures suspended above the substrate 90. Structures such as beams, bridges or reflectors defined in the capping (second structural) layer 94 can be constructed over the planar surface of the wafer 91. During the sacrificial etch, the underlying subject portion of the first structural layer 91 can be removed leaving desired portions and forming structures suspended as shown in FIGS. 9a–9b. Such a technique, referred to as chunk planarization, allows suspended yet planar structures to be fabricated.

The foregoing fabrication process of FIGS. 6a–6f is easily merged with electronic fabrication. After the grinding and polishing steps of FIGS. 6d and 8a–8d, electronics are built into the planar first structural layer 91 using standard processing techniques and without effecting the motor structure. The second structural layer 94 may be merged with other layers needed for electronic fabrication (e.g. interconnect or FET gates). The etchant used to remove the sacrificial layers 92, 93 constrains the materials which can be exposed by other processing without a protecting layer however. Furthermore, varied interconnect and vertical devices can take advantage of the ability to process on both sides of the first structural layer 91, Thus, the foregoing processing techniques of FIGS. 6a–6f and 8a–9b provides an effective manner of fabricating thick structures without the problems of planarity or lithography. Desired circuitry can be built directly into the stress neutral single crystal silicon motor structures to provide actuation thereof. Finally, patterning both sides of the first structural layer 91 may provide the ability to make new mechanical and electrical structures otherwise unavailable.

Figure 7A:
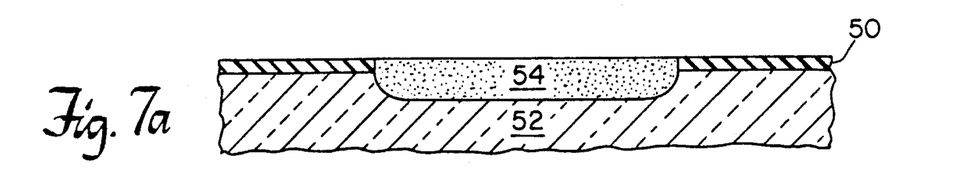
FIGS. 7a–7f are schematic views illustrating yet another alternative fabrication sequence for embodiments of the present invention.

Another alternative fabrication process for embodiments of the present invention is provided in FIGS. 7a–7f. That fabrication process utilizes the local oxidation of silicon (LOCOS) processing. A silicon nitride layer 50 is deposited and patterned on a substrate 52, preferably simultaneously with a continued time etch of the substrate 52, Other insulator layers in place of the silicon nitride layer 50 are suitable. Also, the substrate 52 may be subsequently as opposed to simultaneously etched to form a pocket in the substrate 52 as illustrated in FIG. 7a.

Figure 7B:
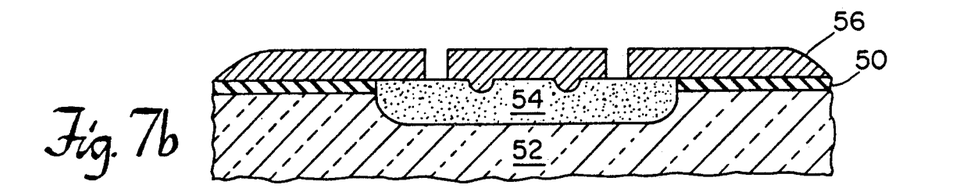

Using a nitride mask, a first sacrificial layer 54 is selectively grown in the pocket area of the substrate 52. Preferably, the first sacrificial layer 54 is silicon oxide and, hence, a LOCOS layer as shown in FIG. 7a. As desired, the first sacrificial layer 54 is selectively etched to outline bushings of the moveable member/rotor as shown in FIG. 7b. A first structural layer 56 is then deposited and patterned to form the stator and moveable member as illustrated in FIG. 7b. Thereafter, etching of the first sacrificial layer 54 results in the embodiments of FIGS. 1a–1b and 2a–2b.

Figure 7C:
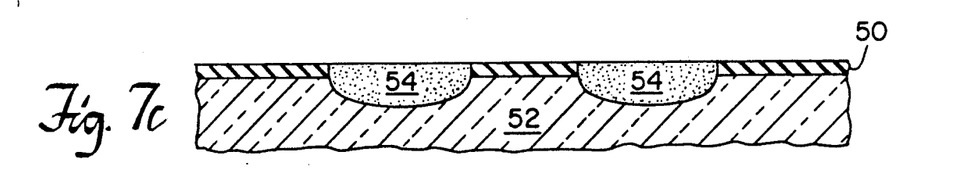
Figure 7D:
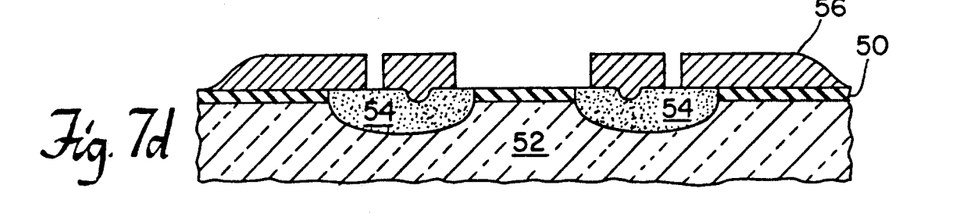
Figure 7E:
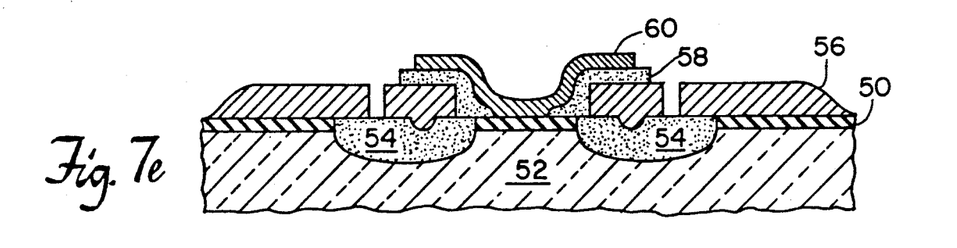

To fabricate the embodiments of FIGS. 3a or 4a, the substrate 52 of the beginning of the step of FIG. 7a is etched to provide an annular ring cavity and layered with an insulator layer 50 on unetched portions of the substrate as shown in FIG. 7c. The first sacrificial layer 54 is then deposited into the annular cavity and etched as desired to outline rotor bushings as illustrated in FIG. 7d. The first structural layer 56 is then deposited and patterned over the insulator 50 and first sacrificial layer 54 to form the rotor and stators as illustrated in FIG. 7d. A second sacrificial layer 58 is then deposited over the rotor and along the contour of the rotor sides facing the center of the rotor. Preferably, this step is performed by a CVD oxide deposition and patterning. A second structural layer 60, preferably polysilicon, is deposited and patterned over the second sacrificial layer 58 and the portion of the substrate 52 between the two cavities. As shown in FIG. 7e, this forms the center bearing with a body portion in the plane of the stator and rotor and an upper portion overhanging the rotor to prevent lateral and vertical movement of the rotor. Finally, an oxide wet strip or other suitable etching is performed to remove the sacrificial layers 54, 58.

Figure 7F:
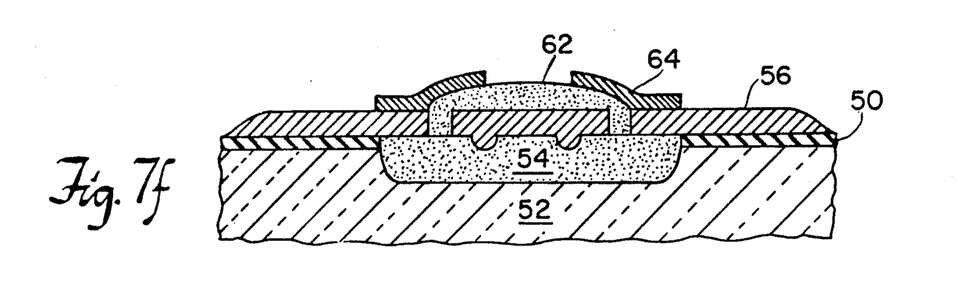

To fully planarize the recessed oxide layer 54, the silicon substrate 52 is isotropically plasma etched, directly after the nitride patterning of FIG. 7a, to the depth required for the subsequent thermal oxide 54 to exactly fill in the cavity. To form the embodiment of FIG. 3b with side bearings extending from the stator the steps of FIGS. 7a and 7b are performed as described previously. Thereafter, a second sacrificial layer 62 is deposited over the rotor portion of the first structural layer 56 as illustrated in FIG. 7f. A second structural layer 64, preferably polysilicon, is then deposited and patterned over the second sacrificial layer 62 and the first structural layer 56 to form side bearings connected to the stators overhanging the moveable member. A subsequent etching of the sacrificial layers 54, 62 frees the moveable member for movement in the plane of operation of the stators as described for the embodiment of FIG. 3b with the side bearings limiting vertical movement. Also as previously mentioned, in a last step, an insulating layer 49 (FIG. 3b) is deposited along the contour of the side bearings and stator portions facing the moveable member.

While the invention has been particularly shown and described with reference to a preferred embodiment thereof, it will be understood by those skilled in the art that various changes in form and details may be made therein without departing from the spirit and scope of the invention as defined by the appended claims. For example, although disclosed for fabrication of a side drive motor, certain techniques can be applied to top and bottom driven motors.

We claim:

1. A method of fabricating an electrostatic micromotor comprising the steps of:

providing a substrate in a plane;

providing on the substrate a first structural layer patterned over a first sacrificial layer such that the sacrificial layer separates portions of the first structural layer from the substrate, the first structural layer patterned to form a first member and a second member spaced across a micron wide gap from each other in a common plane parallel to the plane of the substrate, the second member being connected to the substrate;

providing electrical means for selectively generating and sustaining an operational strength electrostatic field across the micron wide gap between the first and second members in the common plane; and etching the first sacrificial layer to free the first member such that the second member provides a stator and the first member provides a moveable member with respect to the stator under generated electrostatic forces.

2. A method as claimed in claim 1 wherein one of the steps of providing a substrate and providing on the substrate a first structural layer patterned over a first sacrificial layer includes depositing and patterning an insulating layer over the substrate.

3. A method as claimed in claim 1 wherein the step of providing on the substrate includes patterning from the first structural layer bushings coupled to the first member.

4. A method as claimed in claim 1 wherein the step of providing on the substrate a first structural layer patterned over a first sacrificial layer includes:

etching micron wide channels through one side of the first structural layer to outline at least the first and second members;

depositing the first sacrificial layer over the one side of the structural layer to seal the channels;

connecting the substrate to the first sacrificial layer and inverting the first structural layer such that the substrate serves as a support and an opposite side of the first structural layer is an exposed upper planar surface; and grinding down the first structural layer from the side opposite the one side to ends of the channels to form the first and second members spaced across the micron wide gap from each other in a common plane.

5. A method as claimed in claim 1 wherein the step of providing a substrate includes (a) depositing and patterning an insulating layer on the substrate, and (b) etching into the substrate to form a cavity; and the step of providing on the substrate includes (a) providing the first sacrificial layer in the cavity by local oxidation, and (b) depositing and patterning the first structural layer over the first sacrificial layer on the substrate to form in one plane the first member over the first sacrificial layer and the second member partly over the first sacrificial layer spaced apart from the first member by a micron amount and connected to the insulating layer.

6. A method as claimed in claim 1 further comprising the step of providing a bearing connected to one of the substrate and the second member for limiting one of lateral and vertical movement of the moveable member with respect to the stator.

7. A method as claimed in claim 6 wherein the step of providing a bearing includes:

depositing a second sacrificial layer over at least the first member;

depositing and patterning a second structural layer over the second sacrificial layer to form a bearing; and etching the second sacrificial layer along with the etching of the first sacrificial layer.

* * * * *